(12) United States Patent
Wright et al.

(10) Patent No.: US 6,325,129 B1
(45) Date of Patent: Dec. 4, 2001

(54) TEST TUBE ORIENTING SYSTEM

(75) Inventors: Steve J. Wright, Peterborough; Dave J. Murphy, Goodwood, both of (CA)

(73) Assignee: Labotix Automation Inc., Toronto (CA)

( * ) Notice: Subject to any disclaimer, the term of this patent is extended or adjusted under 35 U.S.C. 154(b) by 0 days.

(21) Appl. No.: 09/437,320

(22) Filed: Nov. 10, 1999

(51) Int. Cl.[7] ............................ B65G 17/32; B65G 29/02; B65G 47/24

(52) U.S. Cl. ..................... 156/538; 198/397.01; 198/398; 221/160

(58) Field of Search ...................... 156/538, 539, 156/540; 198/397.01, 398, 444; 221/160

(56) References Cited

U.S. PATENT DOCUMENTS

| | | | |
|---|---|---|---|
| 2,891,697 | * | 6/1959 | Beckers ................................. 221/156 |
| 3,882,994 | * | 5/1975 | Mecks et al. ................... 198/397.01 |
| 4,223,778 | * | 9/1980 | Kontz ..................... 198/389 |
| 4,244,459 | * | 1/1981 | Garrett ................................. 198/389 |
| 4,352,424 | * | 10/1982 | Ichizawa et al. ................. 198/469.1 |

* cited by examiner

*Primary Examiner*—Richard Crispino
*Assistant Examiner*—Sue A. Purvis
(74) *Attorney, Agent, or Firm*—Gowling Lafleur Henderson LLP

(57) ABSTRACT

A test tube orienting system consisting of a test tube hopper, and a test tube transport system for directing test tubes out of the test tube hopper with a consistent orientation. The test tube hopper has an open mouth, an internal cavity communicating with the mouth, and a side wall enclosing the cavity. The side wall has a downwardly inwards sloping channel extending along the side wall from the mouth. The transport system directs the test tubes axially upwards along the channel, and includes an endless chain and a series of pins affixed to the endless chain, extending through the channel into the internal cavity. The endless chain is coupled to a motor for moving the pins upwards along the channel, and is inclined at an acute angle to the channel for progressively retracting the tube supports from the internal cavity as the pins move upwards along the channel.

12 Claims, 4 Drawing Sheets

TEST TUBE ORIENTING SYSTEM

FIELD OF THE INVENTION

The present invention relates to a test tube orienting system. In particular, the present invention to relates to an apparatus for extracting randomly-oriented test tubes from a hopper with a consistent orientation in preparation for automated processing, including packaging and automated biological specimen testing.

BACKGROUND OF THE INVENTION

To reduce the cost of testing biological specimens, automated biological specimen testing systems have been developed whereby test tubes containing biological fluid are conveyed in assembly-line fashion to one or more automated testing stations. Bar codes labels are affixed to each test tube to indicate to the testing station the desired test to be performed. Each test may involve the separation of the biological fluid into multiple portions. Therefore, it is desirable for empty secondary test tubes to be available for insertion into the assembly line on demand behind each specimen.

Randomly-oriented test tubes can be purchased in bulk and stored in a test tube hopper for use as the secondary test tubes. However, randomly-oriented test tubes are not desirable for use in assembly line biologic specimen testing since the test tubes must be properly oriented by hand prior to labeling and insertion into the assembly line. For this reason, medical testing laboratories generally purchase packages of pre-oriented bulk test tubes for use as the secondary test tubes. Still, pre-oriented test tubes are expensive since the test tubes must be pre-oriented and packaged by hand before being shipped to the laboratory. Therefore, there is a need for a system which automatically extracts randomly-oriented test tubes from a test tube hopper and orients the test tubes prior to packaging or specimen testing.

Vibratory bowls are well known mechanisms capable of orienting small parts from a vessel containing randomly-oriented parts. Vibratory bowls include a small open-mouthed bowl for retaining the randomly-oriented parts, and a discharge channel provided adjacent the mouth. The vibratory bowl generally has a saw-tooth vibratory waveform which serves to urge the parts from the bowl and along the discharge channel with a consistent orientation. However, vibratory bowls are very expensive. Furthermore, as the radius of the bowl must increase according to the size of the parts to be oriented, the cost of a vibratory bowl having a size sufficient for orienting test tubes would be prohibitive. Accordingly, there remains a need for a cost-effective solution for extracting randomly-oriented test tubes from a hopper with a consistent orientation.

SUMMARY OF THE INVENTION

It is an object of the present invention to provide a system for providing consistently-oriented test tubes from a test tube hopper containing randomly-oriented test tubes. It is also an object of the present invention to provide a system for extracting randomly-oriented test tubes from a test tube hopper with consistent orientation prior to labeling and insertion into an automated biological specimen testing system.

In accordance with these objects, there is provided a test tube orienting system comprising a vessel for receiving a plurality of test tubes, and a test tube transport system for directing the test tubes out of the vessel. The vessel includes an open mouth, an internal cavity communicating with the mouth, and a side wall enclosing the cavity. The side wall includes a downwardly inwards sloping channel extending along the side wall from the mouth and dimensioned for receiving the test tubes therein. The transport system directs the test tubes axially upwards along the channel, and includes a plurality of tube supports extending through the channel into the cavity. Drive means are coupled to the tube supports for directing the tube supports upwards along the channel while progressively retracting the tube supports from the cavity.

In the preferred embodiment of the invention, the drive means comprises a prime mover and an endless chain driven by the prime mover, and the tube supports comprise equidistantly-spaced elongate pins of equal length affixed to the endless chain. While the chain is being driven, the pins move upwards through the channel, thereby driving test tubes axially upwards against the side wall and along the channel. The chain lies in a plane which makes an acute angle with the side wall so that as the pins approach the mouth of the vessel, the pins are progressively retracted from the cavity. Since test tubes have a rounded closed end, those test tubes which are oriented with their closed end down will fall away from their respective pin as the pin retracts. However, since the diameter of the test tube adjacent the open end is greater than at the closed end, those test tubes which are oriented with their open end down will remain in contact with the pin over the length of the cavity. As a result, all the test tubes which are ejected from the vessel mouth will have the same orientation.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
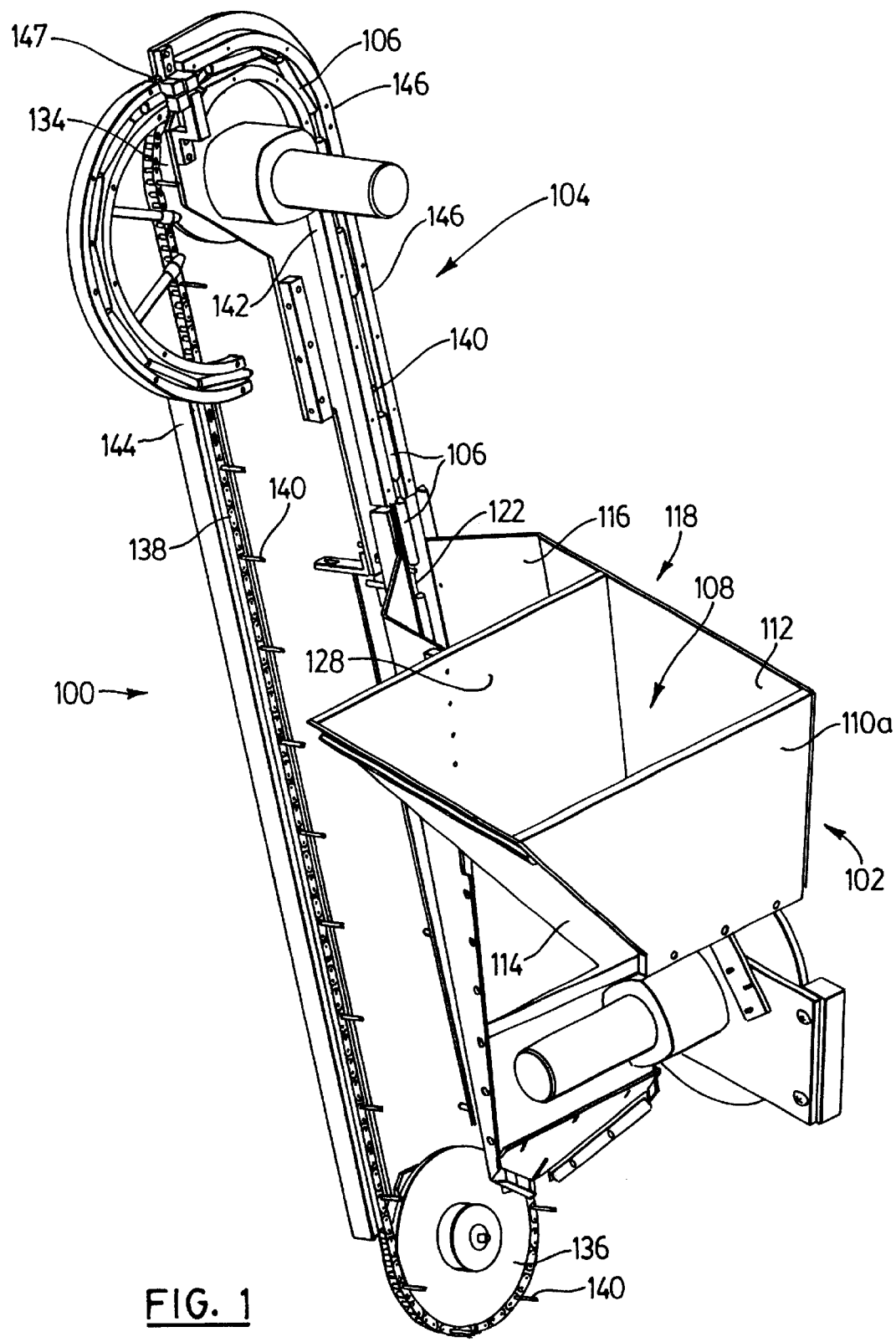
FIG. 1 is a perspective view of the test tube orienting system, according to the invention, showing the test tube hopper and the test tube transport system.

Turning to FIG. 1, a test tube orienting system, denoted generally as 100, is shown comprising a test tube hopper 102, and a transport system 104 coupled to the test tube hopper 102 for extracting test tubes 106 upwards out from the test tube hopper 102.

Figure 2:
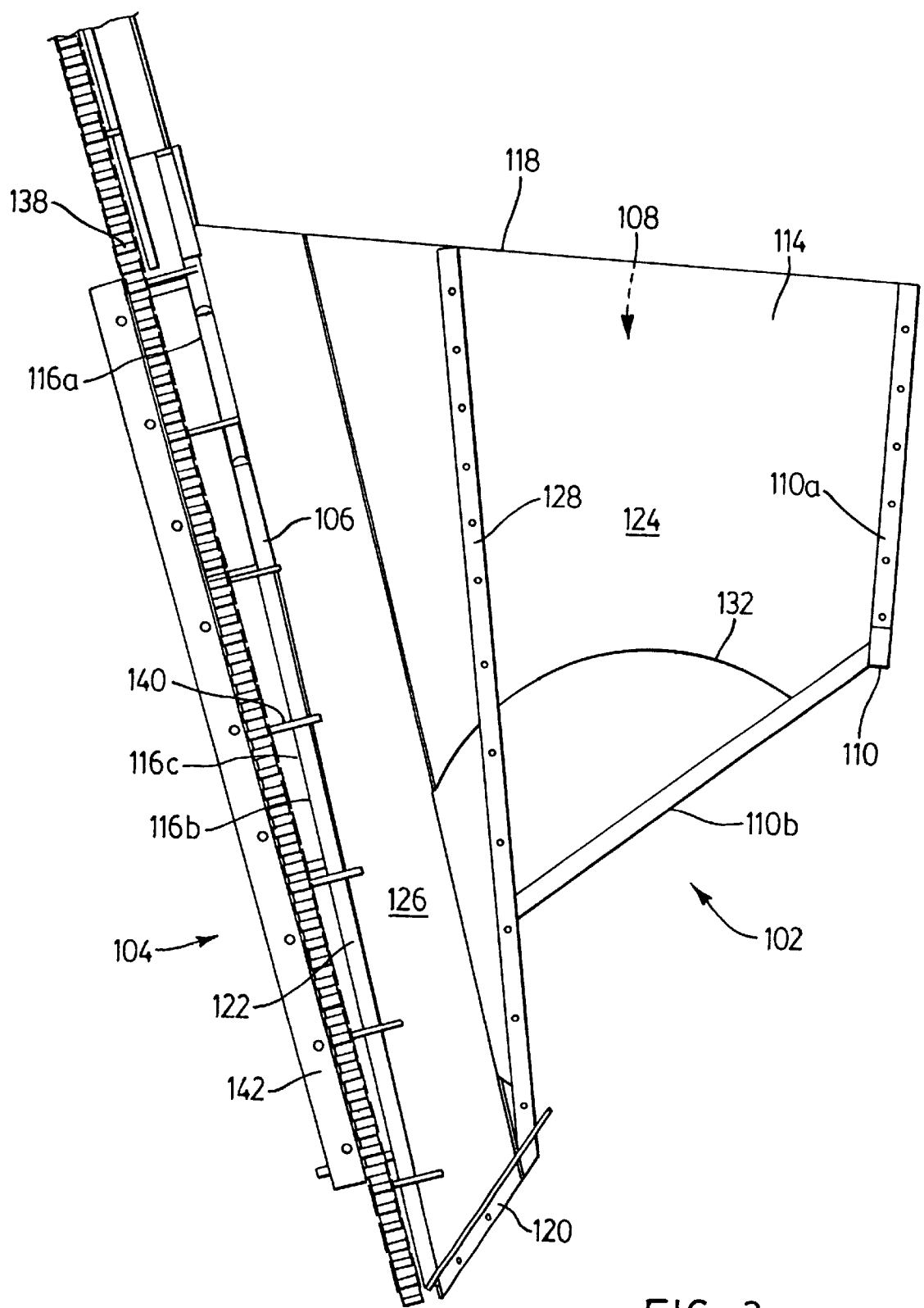
FIG. 2 is a left side view of the test tube hopper and the test tube transport system shown in FIG. 1.

The test tube hopper 102 has an internal cavity 108 (FIG. 2) for receiving the test tubes 106, front, right, left and rear sides walls 110, 112, 114, 116 enclosing the internal cavity 108, and an open mouth 118 communicating with the internal cavity 108 through which the test tubes 106 may be deposited into the internal cavity 108. As shown in FIGS. 1 and 2, the front side wall 110 includes a substantially-vertical upper portion 110a and a lower portion 110b sloping downwardly inwards from the upper portion 110a for directing the test tubes 106 deposited into the test tube hopper 102 towards the rear side wall 116. However, it will be appreciated that the test tube hopper 102 need not adopt the above-described shape, but may instead adopt other shapes or mechanisms for directing the test tubes 106 towards the rear side wall 116.

Figure 3:
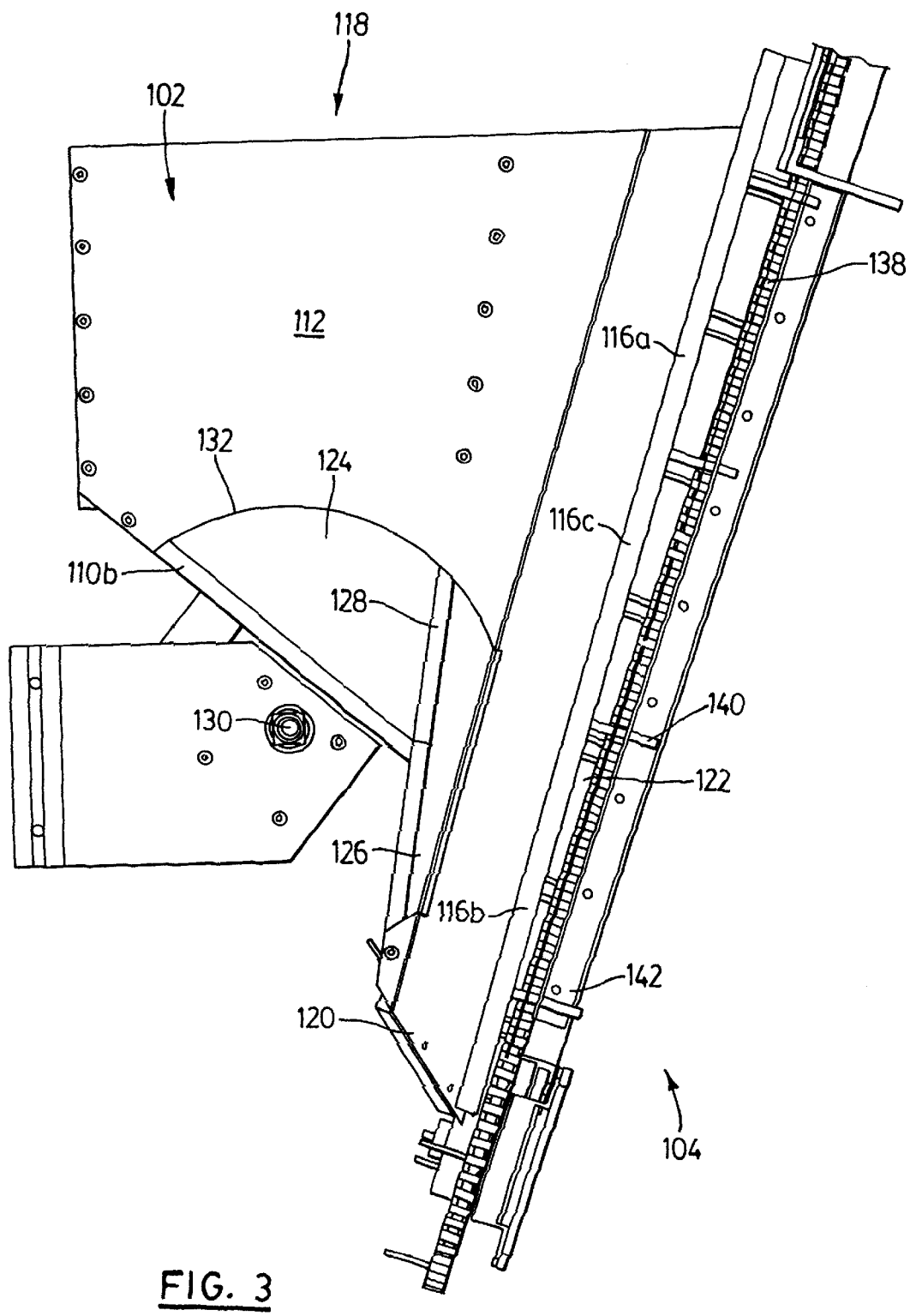
FIG. 3 is a right side view of the test tube hopper and the test tube transport system.

With reference to FIG. 3, preferably the rear side wall 116 also includes an upper portion 116a and a lower portion 116b. The upper portion 116a slopes downwardly inwards from the open mouth 118. The lower portion 116b slopes downwardly inwards from the junction 116c of the upper portion 116a and the lower portion 116b, but at a steeper angle than the upper portion 116a, and mates with the right and left side walls 114, 116 at the base 120 of the test tube hopper 102. As will be explained, the upper portion 116a and the lower portion 116b slope downwards at different angles in order to enhance the orientation capabilities of the test tube orienting system 100. However, other means may be adopted as the footprint of the apparatus dictates.

The rear side wall 116 includes a test tube channel 122 which extends along and through the rear side wall 116 from the open mouth 118 and terminating at a point adjacent the base 120. The test tube channel 122 is dimensioned such that a test tube 106 will be seated in the channel 122 a sufficient depth to allow the test tube 106 to move axially along the length of the channel 122 without falling through the channel 122 and out of the test tube hopper 102.

It will be appreciated that as the volume of test tubes 106 occupying the internal cavity 108 increases, the force exerted by the mass of test tubes 106 against the rear side wall 110 can increase to the extent that it may not be possible to extract test tubes 106 from the test tube hopper 102. To allow the test tubes 106 to be easily removed from the test tube hopper 102 regardless of the volume of test tubes 106 in the test tube hopper 102, the test tube hopper 102 includes a novel bulk material conveyancing system. Turning to FIGS. 2 and 3, the bulk material conveyancing system is shown comprising a primary compartment 124 adjacent the front side wall 110, a secondary compartment 126 adjacent the rear side wall 116 and smaller than the primary compartment 124, and a dividing wall 128 separating the primary and secondary compartments 124, 126. A channel (not shown) is provided between the dividing wall 128 and the right side wall 112 to allow test tubes 106 to pass from the primary compartment 124 to the secondary compartment 126.

Those having experience with the conveyancing of bulk materials will recognize that a bridge of test tubes 106 can form in the channel between the dividing wall 128 and the right side wall 112 as test tubes 106 pass from the primary compartment 124 to the secondary compartment 126. This bridge can restrict and eventually terminate the flow of test tubes 106 from the primary compartment 124 to the secondary compartment 126, and therefore prevent test tube 106 flow out of the test tube hopper 102. To prevent bulk material bridges from terminating test tube 106 flow out of the test tube hopper 102, the bulk material conveyancing system further comprises an agitator disc (not shown) mounted on the shaft 130 (FIG. 3) of an agitator motor disposed below the lower portion 110b. The agitator disc is mounted flush against the right side wall 112 and the right side edges of the lower portion 110b and the rear side wall 116, and includes a rubberized layer provided on the surface of the disc adjacent the primary and secondary compartments 124, 126. In addition, the right side wall 112 includes a cut-out portion 132 adjacent the lower portion thereof to increase the surface area of the rubberized layer exposed to the primary compartment 124 and the secondary compartment 126.

The agitator motor is coupled through control logic to sensors (not shown) provided in the secondary compartment 126. When the sensors detect that the volume of test tubes 106 in the secondary compartment 126 has fallen below a minimum threshold level, indicating possibly the existence of bulk material bridge, the agitator motor is activated, causing the agitator disc to rotate. The rubberized layer of the agitator disc gently agitates any test tubes 106 in the vicinity of the bulk material bridge, thereby causing the bulk material bridge to collapse and allowing test tubes 106 to flow once again from the primary compartment 124 to the secondary compartment 126. When the sensors detect that the volume of test tubes 106 in the secondary compartment 126 has risen to the maximum threshold level, the agitator motor is deactivated to prevent the mass of test tubes 106 in the secondary compartment 126 from hindering extraction of the test tubes 106 from the secondary compartment 126.

With reference now to FIGS. 1, 2 and 3, the transport system 104 is shown comprising an upper sprocket 134, a lower sprocket 136, and an endless chain 138 directed around the upper and lower sprockets 134, 136. A plurality of elongate pins 140 of equal length are secured to the endless chain 138. A first chain guide 142 is positioned adjacent the outer surface of the rear side wall 116, and extends from the lower sprocket 136 to the upper sprocket 134 along a path parallel to the test tube channel 122. A second chain guide 144 extends from the upper sprocket 134 to the lower sprocket 136 along a line parallel to the test tube channel 122, but laterally displaced a distance from the test tube channel 122. As will be appreciated, the first and second chain guides 142, 144 guide the endless chain 138 between the upper and lower sprockets 134, 136 and serve to restrict unwanted lateral movement of the endless chain 138.

As shown most clearly in FIGS. 2 and 3, the pins 140 are spaced along the length of the endless chain 138, with the distance between adjacent pins 140 being greater than the length of the test tubes 106. Preferably, the pins 140 are equidistantly spaced apart. When the pins 140 travel along the first chain guide 142, the pins 140 proximate the test tube hopper 102 extend through the test tube channel 122 and into the secondary compartment 126. However, the first and second chain guides 142, 144 lie in a plane which makes an acute angle with the lower portion 116b of the rear side wall 116. As a result, the pins 140 positioned adjacent the base 120 extend more fully into the second compartment 126 than the pins 140 positioned adjacent the open mouth 118. On the other hand, as will be apparent from FIG. 3, the first and second chain guides 142, 144 lie in a plane which is parallel to the upper portion 116a of the rear side wall 116. Accordingly, the degree of penetration of the pins 140 into the test tube channel 122, between the open mouth 118 and the junction 116c of the upper portion 116a and the lower portion 116b, remains constant.

Figure 4:
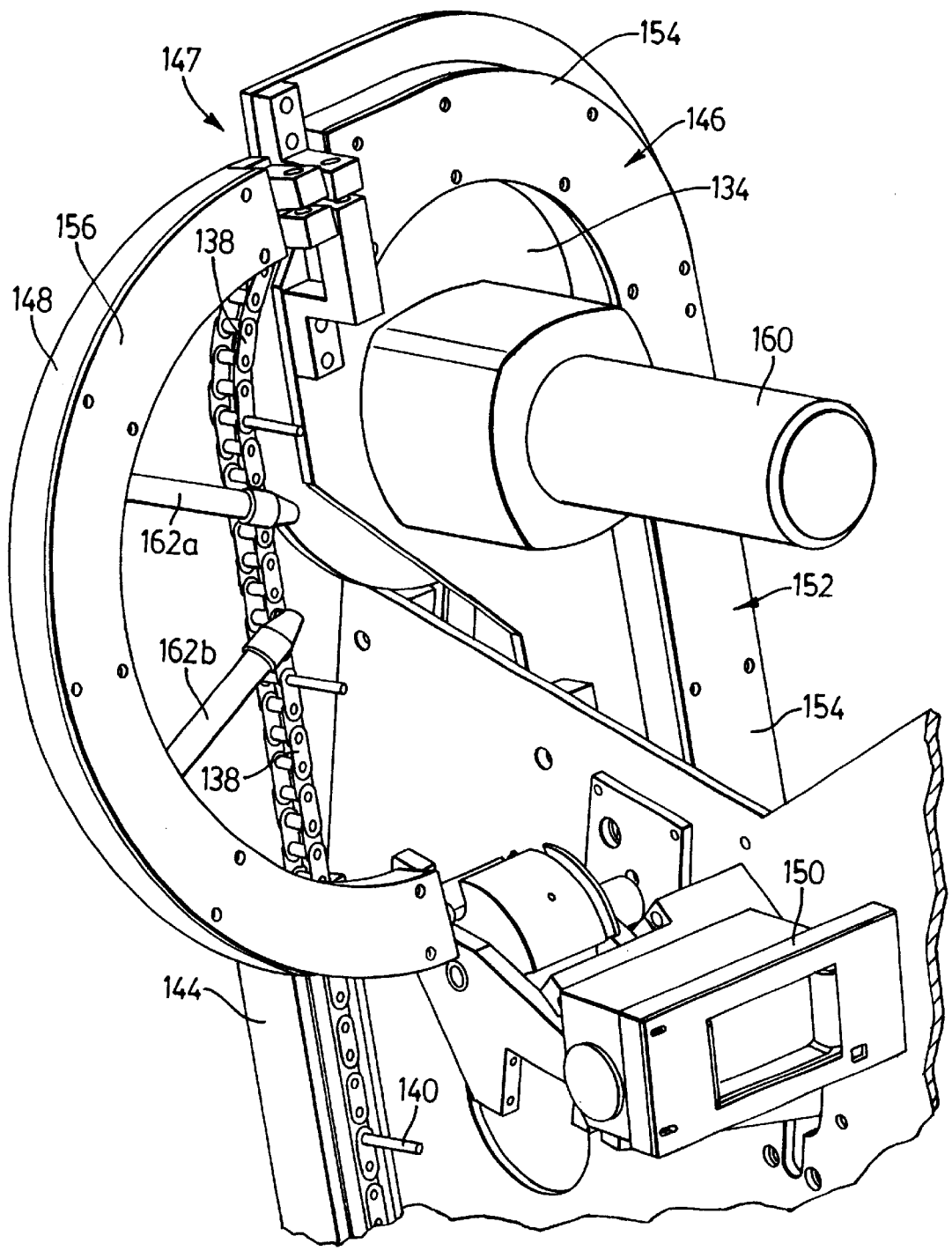
FIG. 4 is a front view of the test tube orienting system, showing the upper portion of the test tube transport system.

With reference now to FIGS. 1, 2 and 4, the transport system 104 is shown also including a first test tube guide 146 coupled to the test tube channel 122 at the open mouth 118, and a C-shaped second test tube guide 148 coupled to the outlet of the first test tube guide 146. A test tube labeling station 150 is shown coupled to the outlet of the second test tube guide 146. However, it will be appreciated that the test tube labeling station 150 could be replaced with any other suitable station, such as a test tube packaging station.

The first test tube guide 146 extends from the open mouth 118 towards the upper sprocket 134, bends around the outer circumference of the upper sprocket 134, and terminates at a point adjacent the apex 147 of the path taken by the endless chain 138. The first test tube guide 146 includes a first guide channel 152 through which the pins 140 extend into the first test tube guide 146. The first guide channel 152 is axiallyaligned with and is dimensionally similar to the test tube channel 122, but has a greater depth than the test tube channel 122 so as to allow the test tubes 106 which travel from the test tube channel 122 to the first guide channel 152 to be more deeply seated in the first guide channel 152 than in the test tube channel 122. The first test tube guide 146 also includes a cover 154 which mates with the first guide channel 152 to retain the test tubes 106 in the first guide channel 152.

The second test tube guide 148 includes a second guide channel 156 and mating cover 158, and is displaced a finite distance from the apex 147 of the endless chain 138 path so as to allow the pins 140 to travel from the apex 147, between the first and second test tube guides 146, 148 and along the second chain guide 144. The second guide channel 156 is dimensionally similar to the first guide channel 152 and, together with the mating cover 158, conveys the test tubes 106, as they are brought to the apex 147, to the labeling station 150 under influence of gravity.

As shown in FIG. 4, the upper sprocket 134 is coupled to a motor 160 for rotating the upper sprocket 134 in response to demand for test tubes 106. The motor 160 is coupled through control logic to first and second sensors 162a, 162b communicating with the second test tube guide 148. When the first sensor 162a detects the absence of test tubes 106 adjacent the first sensor 162a, the motor 160 is activated, causing the upper sprocket 134 to rotate and the pins 140 disposed in the test tube channel 122 to be directed upwards through the test tube channel 122. Since the test tubes 106 are directed against the rear side wall 116 by the mass of the test tubes 106 in the secondary compartment 126 and by the agitator disc, the pins 140 will engage the test tubes 106 proximate the pins 140 and direct the engaged test tubes 106 axially upwards along the test tube channel 122. As will be appreciated, all of the pins 140 will not necessarily be successful in directing a test tube 106 along the channel 122.

Since the first chain guide 142 lies in a plane which makes an acute angle with the rear side wall 116, the pins 140 will progressively retract from the secondary compartment 126 as the pins 140 are directed upwards along the test tube channel 122. As a result, the lowermost portion of each test tube 106 in the test tube channel 122 will become progressively less supported by its respective supporting pin 140. The angle of incline of the test tube channel 122, in conjunction with the rate of retraction of the supporting pins 140, causes a moment to be developed about the longitudinal axis of each test tube 106 in the test tube channel 122. The angle of incline of the test tube channel 122 and the rate of retraction of the supporting pins 140 is selected such that for those test tubes 106 which have their rounded closed ends oriented downwards in the test tube channel 122, the resulting moment is sufficient to eject those test tubes 106 from the test tube channel 122 back into the test tube hopper 102. However, for those test tubes 106 which have their open ends oriented downwards in the test tube channel 122, the resulting moment is insufficient to eject these latter test tubes 106 from the test tube channel 122. As a result, all of the test tubes 106 which reach the open mouth 118 of the test tube hopper 102 will be consistently oriented with their rounded closed ends upwards in the test tube channel 122. Other mechanisms for producing the moment described above will be immediately apparent to those skilled in art.

As discussed above, it is preferable that the lower portion 116b of the rear slide wall 116 slopes downwardly inwards from the junction 116c at a steeper angle than the upper portion 116a Therefore, as the test tubes 106 in the test tube channel 122 pass the junction 116c, the lower ends of the test tubes 106 are displaced further from the tips of the pins 140, further facilitating ejection from the test tube channel 122 of those test tubes 106 which are oriented with their rounded closed ends downwards. However, it will be appreciated that depending upon the available footprint, junction 116c may be eliminated and the angle of incline of the test tube channel 122 and the rate of retraction of the pins 140 may be adjusted to achieve satisfactory results.

Between the junction 116c and the open mouth 118, the degree of penetration of the pins 140 into the test tube channel 122 remains constant. Accordingly, any test tubes 106 which pass the junction 116c will remain seated in the test tube channel 122. The test tubes 106 are then conveyed upwards along the first test tube guide 146 by the pins 140 to the apex 147. The test tubes 106 are prevented from falling out of the first test tube guide 146 as the test tubes 106 approach the apex 147 by virtue of the mating cover 154 and the increased depth of the first guide channel 152.

Once the test tubes 106 reach the apex 147, the endless chain 138 directs the pins 140 downwards towards the second chain guide 144. However, after the pins 140 pass the apex 147, the test tubes 106 are urged from the first test tube guide 146 into the second test tube guide 148 and towards the labeling station 150 under influence of gravity. If the rate at which the test tubes 106 enter the second test tube guide 148 exceeds the rate at which the test tubes are labeled at the labeling station 150, the second test tube guide 148 will fill with test tubes 106. When the level of test tubes 106 in the second test tube guide 148 reaches the first sensor 162a, the control logic coupled to the first sensor 162a and the motor 160 causes the motor 160 to be deactivated and further upwards movement of the pins 140 along the test tube channel 122 to cease.

Since the test tubes 106 are ejected from the second test tube guide 148 into the labeling station 140 under influence of gravity, it is desirable that a critical mass of test tubes 106 be maintained in the second test tube guide 148 to ensure that the test tubes 106 are ejected into the labeling station 150 with sufficient force to allow for proper operation of the labeling station 150. Accordingly, in the embodiment shown in FIG. 4, the second sensor 162b is coupled to the labeling station 150 through control logic for activating the labeling station 150 once the level of test tubes 106 in the second test tube guide 148 reaches the second sensor 162b. However, it will be appreciated that, depending upon the application, the second sensor 162b can be eliminated from the second test tube guide 148.

The description of the preferred embodiment herein is intended to be illustrative, rather than exhaustive of the present invention. Those persons of ordinary skill will be able to make certain additions, deletions and/or modifications to the described embodiments without departing from the spirit or scope of the invention, as defined by the appended claims.

We claim:

1. A test tube orienting system comprising:
  a vessel for receiving a plurality of test tubes, the vessel including an open mouth, an internal cavity communicating with the mouth, and a side wall enclosing the cavity, the side wall including a downwardly inwards sloping channel extending along the side wall from the mouth and being dimensioned for receiving the test tubes therein; and
  a transport system for directing the test tubes axially upwards along the channel, the transport system including a plurality of tube supports extending through the channel into the cavity, and drive means coupled to the tube supports for directing the tube supports upwards along the channel while progressively retracting the tube supports from the cavity.

2. The test tube orienting system according to claim 1, wherein the drive means comprises an endless chain disposed in a plane acute to the channel and an actuator coupled to the endless chain, and the tube supports comprise elongate pins extending from the endless chain for engaging a lowermost portion of the test tubes.

3. The test tube orienting system according to claim 2, wherein the channel includes an upper portion and a lower portion, the upper portion being parallel to the acute plane.

4. The test tube orienting system according to claim 2, wherein the transport system includes a tube guide coupled to the channel, and sensor means coupled to the actuator responsive to test tubes in the tube guide for controlling a rate of test tubes directed along the channel.

5. The test tube orienting system according to claim 1, wherein the vessel includes a first compartment, a second compartment communicating with the first compartment and the channel, and means for directing the test tubes from the first compartment towards the second compartment.

6. The test tube orienting system according to claim 5, wherein the directing means includes sensor means responsive to a volume of test tubes in the second compartment for controlling the volume of the test tubes therein.

7. A test tube labeling system comprising:

a vessel for receiving a plurality of test tubes, the vessel including an open mouth, an internal cavity communicating with the mouth, and a side wall enclosing the cavity, the side wall including a downwardly inwards sloping channel extending along the side wall from the mouth and being dimensioned for receiving the test tubes therein;

a transport system for directing the, test tubes axially upwards along the channel, the transport system including a plurality of tube supports extending through the channel into the cavity, drive means coupled to the tube supports for directing the tube supports upwards along the channel while progressively retracting the tube supports from the cavity; and a test tube labeling station coupled to the channel for labeling test tubes received from the channel.

8. The test tube labeling system according to claim 7, wherein the drive means comprises an endless chain disposed in a plane acute to the channel and an actuator coupled to the endless chain, and the tube supports comprise elongate pins extending from the endless chain for engaging a lowermost portion of the test tubes.

9. The test tube labeling system according to claim 8, wherein the channel includes an upper portion and a lower portion, the upper portion being parallel to the acute plane.

10. The test tube labeling system according to claim 8, wherein the transport system includes a tube guide coupled between the channel and the labeling station, and sensor means coupled to the actuator responsive to test tubes in the tube guide for controlling a rate of test tubes directed to the labeling station.

11. The test tube labeling system according to claim 7, wherein the vessel includes a first compartment, a second compartment communicating with the first compartment and the channel, and means for directing the test tubes from the first compartment towards the second compartment.

12. The test tube labeling system according to claim 11, wherein the directing means includes sensor means responsive to a volume of test tubes in the second compartment for controlling the volume of the test tubes therein.

* * * * *